S. L. WORSLEY.
MACHINE FOR THREADING SCREWS.

No. 177,976. Patented May 30, 1876.

WITNESSES:
J. C. B. Woods.
Frank Arnold.

INVENTOR
Saml. L. Worsley.

UNITED STATES PATENT OFFICE.

SAMUEL L. WORSLEY, OF PROVIDENCE, RHODE ISLAND, ASSIGNOR TO AMERICAN SCREW COMPANY, OF SAME PLACE.

IMPROVEMENT IN MACHINES FOR THREADING SCREWS.

Specification forming part of Letters Patent No. 177,976, dated May 30, 1876; application filed September 16, 1875.

*To all whom it may concern:*

Be it known that I, SAMUEL L. WORSLEY, of the city and county of Providence, in the State of Rhode Island, have invented certain new and useful Improvements in Machines for Threading Screws; and I do hereby declare that the following specification, taken in connection with the drawings, making a part of the same, is a full, clear, and exact description thereof.

Figure 1:
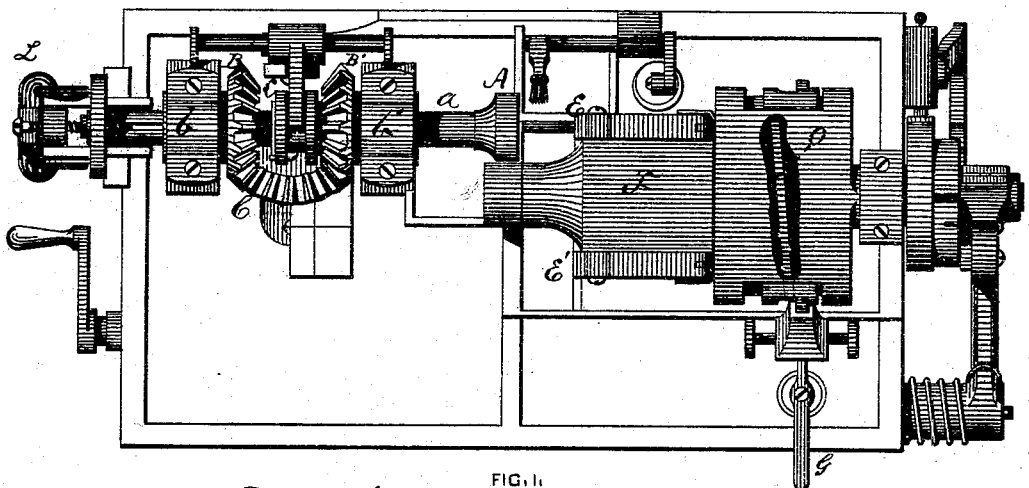
Figure 2:
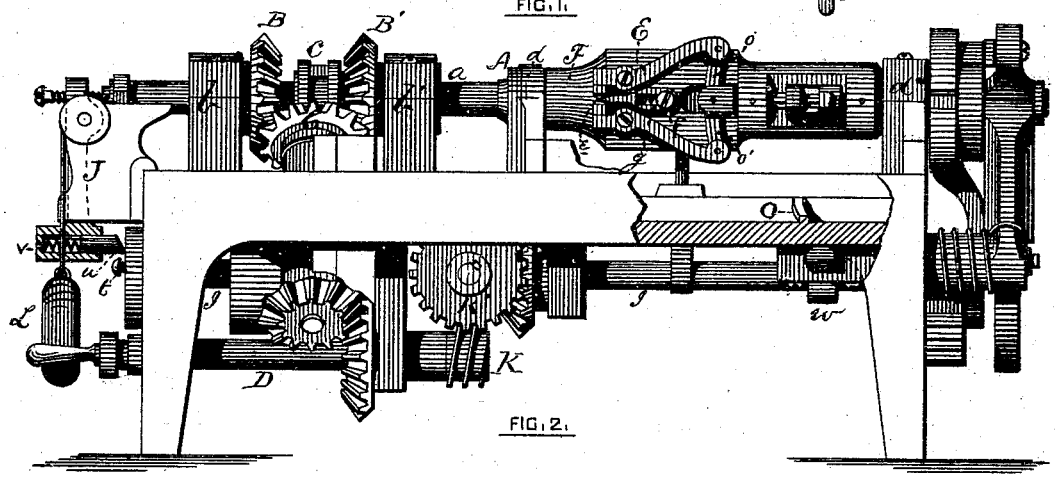
Figure 3:
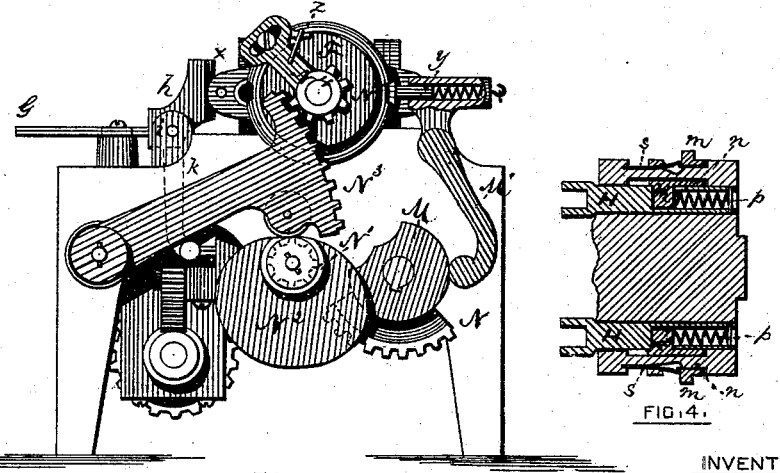
Figure 4:
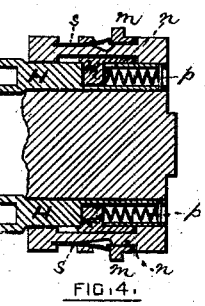

Figure 1 is a top view. Fig. 2 is a side elevation. Fig. 3 is an end view. Fig. 4 is a section showing the device for enabling the griping-jaws to accommodate themselves to blanks of varying sizes.

The machine hereinafter described belongs to the class which employs revolving dies for cutting the threads of what are technically called "fine-threaded machine-screws," as distinguished from wood-screws, whose threads are cut by a reciprocating chasing-tool.

Referring to the drawings, A is a die-holder, mounted on the end of an arbor, $a$, and which holder is to be furnished with suitable dies for cutting a screw-thread. The arbor $a$ is set in proper bearings $b$ $b'$, and is revolved in the right direction for cutting a thread, and afterward in the opposite direction for backing off the same, by means of a double-faced clutch, $c$, which is connected with the arbor by a spline, and is locked with first one and afterward with the other of two bevel-gear wheels, B B', which revolve around the arbor $a$ in opposite directions, and obtain their motion from an intermediate bevel-gear wheel, C, which is driven by power transmitted from the principal driving-shaft D, as clearly shown at Fig. 2.

In combination with the revolving dies, for cutting the thread are two pairs of griping-jaws, for holding the blanks to be threaded. These jaws E E' are attached to a spindle or head-stock, F, mounted in bearings $d$ $d'$, and arranged to make intermittently a half revolution, so as to bring the axis of each pair of jaws successively into coincidence with the axis of the revolving dies. It is to be supposed that, while one pair of the jaws is holding a blank which is undergoing the operation of threading, the fellow pair of jaws is receiving a fresh blank by means of any of the many automatic feeding attachments employed in screw-cutting machines, or by hand. Upon the completion of the thread, the spindle F is made to revolve half-way around, and bring the other pair of jaws into the proper relation to the dies to enable the blank held by them to be threaded. This general mode of operation is already well known in machinery for cutting wood-screws.

A feature of the machine which constitutes one part of the present invention is the combination, with the griping-jaws, of a pivoted tongue-piece, $e$, capable of yielding longitudinally, and designed to engage with the nicks in the heads of the screw-blanks, and prevent them from turning in the jaws while under the action of the threading-dies. This tongue-piece, being located midway between the jaws, and pivoted to the spindle F at $f$, as shown at Fig. 2, is able to enter the nicks in the heads of the blanks, notwithstanding that such nicks are not cut exactly on a diametrical line. It is seated also upon a spring, $g$, so as to be capable of yielding longitudinally in case the nick in which it is to enter is not of full depth.

I am aware that a screw-driver has been before used in combination with a pair of revolving griping-jaws to assist in preventing the blank from turning while held in the jaws; but my improvement resides in making such screw-driver or tongue-piece adjustable laterally, and yielding longitudinally. This feature is of great importance in machines which employ threading-dies instead of a reciprocating chasing-tool, and especially is it of value in case the griping-jaws are constructed, as in this instance, Fig. 4, to close upon the blanks against a yielding spring, in order to hold, without bruising them, blanks of varying sizes.

In the machine as represented in the drawings the blanks to be threaded are supplied successively, by hand, to the pair of jaws E or E', which, as the case may be, are nearest to the operator of the machine. The jaws are made to open and close by means of a hand-lever, G, Figs. 1 and 3, which works a sliding head-block, $h$, Fig. 3, which is pivoted on a fulcrum-bar, $i$, and has a downwardly-projecting arm, $k$, the office of which will be hereafter referred to. The sliding head-block $h$ engages with an ear-piece, $m$, on the bar $m'$, Fig. 4, which is mounted so as to slide on the guide-rod $n$, and thereby move outward or inward the bar H, which works the pivoted toggle-levers $o\ o'$, Fig. 2, of the griping-jaws E E$'$. Inasmuch as the said jaws are enabled to accommodate themselves to blanks above the average size, by reason of the fact that their operating-bar H is combined with the sliding piece $m'$ by a cushion-spring, $p$, Fig. 4, it is necessary that the jaws, after they have closed upon a blank, should be locked fast. This is effected by means of a spring-latch, $s$, which is set in the guide-rod $n$, and whose end springs outward and abuts against the ear-piece $m$ of the bar $m'$, when sufficient force is applied through the hand-lever G to cause the jaws to gripe a blank.

It is to be supposed now that the spindle F, to which the jaws E E$'$ are attached, has made a half-revolution, so as to bring the axis of the blank, which has just been inserted in the jaws, into coincidence with the axis of the threading-dies. The arbor $a$ is now revolving in the direction for cutting a thread, and, being capable of an endwise movement in its bearings, it is caused to move forward, so that the threading-dies will be pressed against the end of the blank by the action of a projecting cam-face, $t$, Fig. 2, which revolves with the main cam-shaft I, and, coming into contact with the beveled face of the spring-seated pin $u$, gives movement to the pivoted lever J, which, in its turn, causes the arbor $a$ to be slid forward in its bearings, and the dies to engage with the end of the blank.

It will be observed that the pin $u$ is seated upon a spring, $v$. The pressure, therefore, which the dies exert upon the end of the blank is a yielding one, and dependent upon the tension of the spring, so that the dies are enabled to take their bite upon the blank in the same manner that they would if pressed against the blank by hand. After the dies have taken their hold they will continue to cut so long as they are permitted to revolve in that direction.

The combination above described for enabling the dies to bear upon the end of the blank with a yielding pressure, is substantially shown in the Letters Patent heretofore granted to me, dated August 10, 1875, and No. 166,490, but is not claimed therein, for the reason that the invention was made by me in connection with a machine herein described, and at an earlier date than the machine described in said above-mentioned patent.

The main cam-shaft I is driven by the worm K on the driving-shaft through the intermediate transverse shaft K$'$, geared therewith. It carries a cam, which is properly timed to shift the clutch $c$ after the thread has been cut, and thereby cause the dies to revolve in the opposite direction to back off from the screw.

Meanwhile, the revolution of the cam-shaft I has brought a toe, $w$, Fig. 2, into engagement with the end of a transverse bar underneath the platform of the table of the machine, and the sliding movement thus given to such bar is made effective to push outward the downwardly-projecting arm $k$, Fig. 3, of the sliding head-block $h$. This movement causes a projecting lip or tongue-piece, $x$, on the face of the head-block to be pressed against the spring-latch $s$, whereupon the jaws become unlocked, and the operator, by moving the hand-lever G, can open the jaws and allow the finished screw, which has been made by the operation of the machine preceding that above described, to be discharged, and a fresh blank to be inserted.

So soon as the threading-dies have backed off from the thread which they have above been described as cutting, the weight L, Fig. 2, which is attached to the arbor $a$, pulls the latter backward in its bearings clear of the finished screw. The cam-shaft I has now revolved so far that the cam M, Fig. 3, (which has hitherto held the vibrating lever M$'$ in such position that the spring latch-bolt $y$ can engage with a notch to hold fast the revolving spindle F,) will permit the tail of the lever M$'$ to fall into a recess in the cam, when a spring, suitably applied to the said lever, will vibrate it upon its pivot and withdraw the latch-bolt $y$. The continued revolution of the shaft I causes the segment-gear N, Fig. 3, to engage with a pinion, N$^1$, Fig. 3, whereby the cam N$^2$, Fig. 3, to which such pinion is attached, is made to raise the toothed radius-arm N$^3$, and in so doing the toothed arm N$^4$, which carries a spring-pawl, $z$, is made to rotate the spindle F a half revolution, which brings a fresh blank into position for all the preceding described operations to be repeated.

In order to insure the proper action of the mechanism above described for springing the fastening-latch $s$, and unlocking the griping-jaws, a scroll-rib, O, (shown at Figs. 1 and 2,) is arranged concentric with the spindle F upon the surface of the table of the machine, and which, in an obvious way as the spindle is revolved, enables the projecting ear-piece $m$ of the sliding bar $m'$ to always bring the latter into such position as to make it certain that the tongue-piece $x$ on the sliding block $h$ will act properly to compress the spring $s$ to unlock the jaws.

This device is important in case the operator or the mechanician for the purpose has failed to insert a blank in the jaws.

What I claim as my invention, and desire to secure by Letters Patent, is—

1. The combination, with the griping-jaws of a screw-threading machine, of a laterally-adjustable and longitudinally-yielding tongue-piece, $e$, to engage with the nick in the head of the blank, substantially as described.

2. The combination, substantially as described, of the die-arbor $a$, free to move longitudinally in its bearings, suitable mechanism, as described, for giving a to-and-fro movement to the arbor, and a spring-seat, $u$, interposed between the arbor and the device which actuates it forward, whereby the threading-dies can be brought to bear against the end of the blank with a yielding pressure, substantially as specified.

3. The combination of the sliding pivoted block $h$, provided with a tongue-piece, $x$, the spring-latch $s$, and suitable devices for causing the tongue-piece to depress the latch, substantially as described.

4. The combination of the scroll-guide O, the revolving spindle F, and the devices for locking the jaws, substantially as described.

SAML. L. WORSLEY.

Witnesses:
J. C. B. WOODS,
FRANK J. ARNOLDE.